MAGNETIC MEMORY DEVICE

Filed May 10, 1957 2 Sheets-Sheet 1

Inventors
ROBERT W. HUGHES
DANIEL G. FAWCETT
By Philip M. Bolton
Attorney

July 18, 1961 R. W. HUGHES ET AL 2,993,196

MAGNETIC MEMORY DEVICE

Filed May 10, 1957 2 Sheets-Sheet 2

Inventors
ROBERT W. HUGHES
DANIEL G. FAWCETT
By Philip M. Bolton
Attorney 2,993,196
MAGNETIC MEMORY DEVICE Robert W. Hughes, Mountain Lakes, and Daniel G. Fawcett, Upper Montclair, N.J., assignors to International Telephone and Telegraph Corporation, Nutley, N.J., a corporation of Maryland Filed May 10, 1957, Ser. No. 658,307
12 Claims. (Cl. 340—174)

This invention relates to magnetic memory devices and in particular to a parallel-serial readout arrangement for a magnetic memory system.

Magnetic memory systems are well known and are described in numerous publications such as the October 1953 issue of the Proceedings of the IRE. Such memory systems are generally composed of a plurality of saturable magnetic elements arranged in rows and columns which are in turn arranged in planes or sheets. Such a sheet is often referred to as a "storage matrix." It is customary to inductively couple to each element at least three wires or three windings: a row wire or row winding, a column wire or column winding and a readout wire or readout winding. In one design each of the elements in a row has a wire passing therethrough and since the elements are small, the proximity of the wire plays the same role as a winding on the element might play. There are second wires passing through each element representing each column and a third wire threaded throughout each element in a plane for a readout. In the other design the row windings are serially connected to each other according to rows; the column windings are serially connected to each other according to columns; and the readout windings are serially connected to each other throughout a plane. These systems normally have a plurality of the above-described planes or sheets arranged in a stack. In the prior art, there is coupled, respectively, to each of the column and row wires or serial connections, of each plane, a selection and driving pulse means for selecting a particular row and a particular column, and for respectively passing driving pulses thereto to effect a coincidence of the pulses at the intersection of the selected rows and columns. In the type of system described thus far, there is stored binary information bits along corresponding points of column and row intersections in each plane, with as many as 36 planes in the system, such that a readout or coincidence of the driving pulses results in a parallel simultaneous readout of 36 "on" or "off" signals. This type of magnetic memory system and readout system is acceptable for data processing schemes using strictly parallel operations. However, this type of magnetic memory system has some undesirable aspects when used with schemes which are characterized by a parallel-serial operation and has an excess of equipment when used with this latter type of operation.

For instance, in a parallel-serial operation it is preferable to have the information pass sequentially from the memory device to effect the serial characteristic. An example would be the readout from a storage device of the binary-decimal number 1234, whereby it would be desirable to remove the numbers as follows:

| | | | | wts |
|---|---|---|---|---|
| 1 | 0 | 1 | 0 | (1) |
| 0 | 1 | 1 | 0 | (2) |
| 0 | 0 | 0 | 1 | (4) |
| 0 | 0 | 0 | 0 | (8) |

time →

To read this same number 1234 from a memory device in a strictly parallel operation would require 16 parallel planes and would appear as follows:

1000010011000010 ↑ time

Obviously the number removed from the 16 parallel planes would have to be realigned to effect a serial characteristic.

In a parallel-serial operation a "word" is preferably stored along a row rather than along a line that passes through many planes where the corresponding rows and columns intersect, and since the information can be read sequentially along the row, it is not necessary to have a complicated column selecting device as well as a row selecting device.

Another problem that arises with the magnetic memory device is that the readout is destructive and if the user merely wants the information from the memory but wants the memory to retain the information for another readout it becomes obvious that the information must be restored.

It then follows from the above discussion that it would be desirable for magnetic memory systems, to be used with parallel-serial operations, to have an arrangement which would simply select the row for a drive pulse, sequentially select the columns for a drive pulse to get coincidence at the intersections of rows and columns for readout, and restore the readout information.

It is therefore an object of this invention to provide an improved magnetic memory system.

It is a further object of this invention to provide an improved magnetic memory system which is adapted to effect a parallel-serial readout operation.

It is a still further object of this invention to provide a magnetic memory system which accomplishes the last-mentioned object with a single drive pulse for effecting a sequential readout of information.

A yet further object of this invention is the provision of a re-write circuit to restore to the memory device the information read therefrom.

In accordance with a main feature of the present invention there is provided a pulse delay distributor means for distributing a single column driving pulse to effect sequential selection of the columns by said single driving pulse, whereby the necessary coincidence of the row driving pulse and the column driving pulse follows the sequential pattern which results from the delaying operation.

A further feature of the present invention provides for a feedback of the readout signal to effectively restore a magnetic element whose flux polarity has been reversed by the coincidence of the driving pulses to the state of saturation that characterized said magnetic element prior to being subjected to the driving pulses.

A still further feature of the present invention provides for a number of planes of saturable magnetic elements with said number being sufficient to accommodate the code combinations being used in the operation.

The foregoing and other objects and features of this invention and the manner of attaining them will become more apparent and the invention itself will be best understood, by reference to the following description of an embodiment of the invention taken in conjunction with the accompanying drawings comprising FIGS. 1, 2, 3 and 4, wherein.

Figures 2, 3A, 3B, 4:
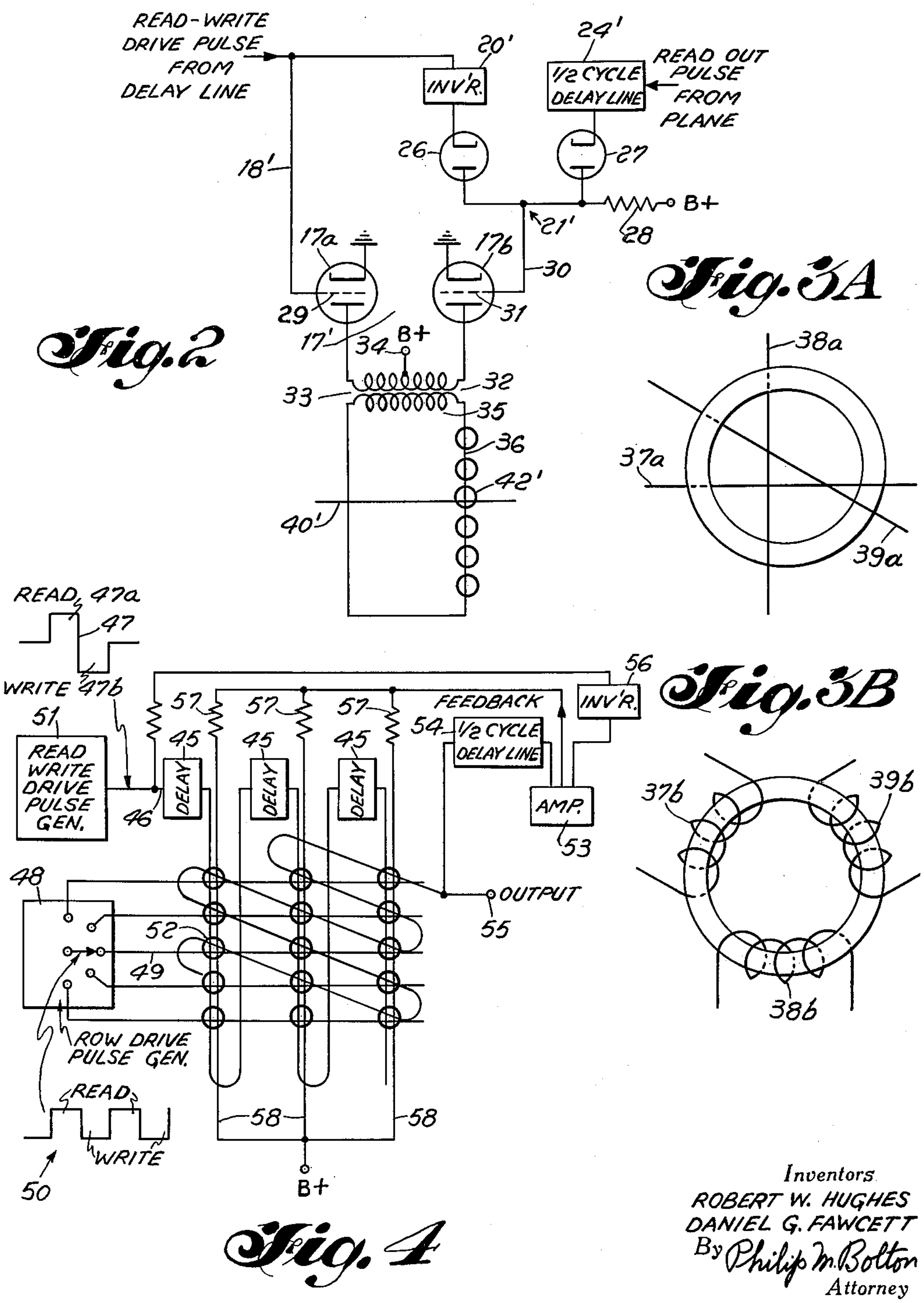
FIG. 2 is a schematic of the inverter, "and" gates and the amplifier shown in FIG. 1.

FIGS. 3*a* and 3*b* are schematic diagrams of two versions of a single saturable magnetic element showing respectively three wires and three windings inductively coupled thereto; and FIG. 4 is a combination block and schematic diagram of a magnetic memory system using a plurality of delay lines and eliminating the plurality of amplifiers and plurality of "and" gates.

Figure 1:
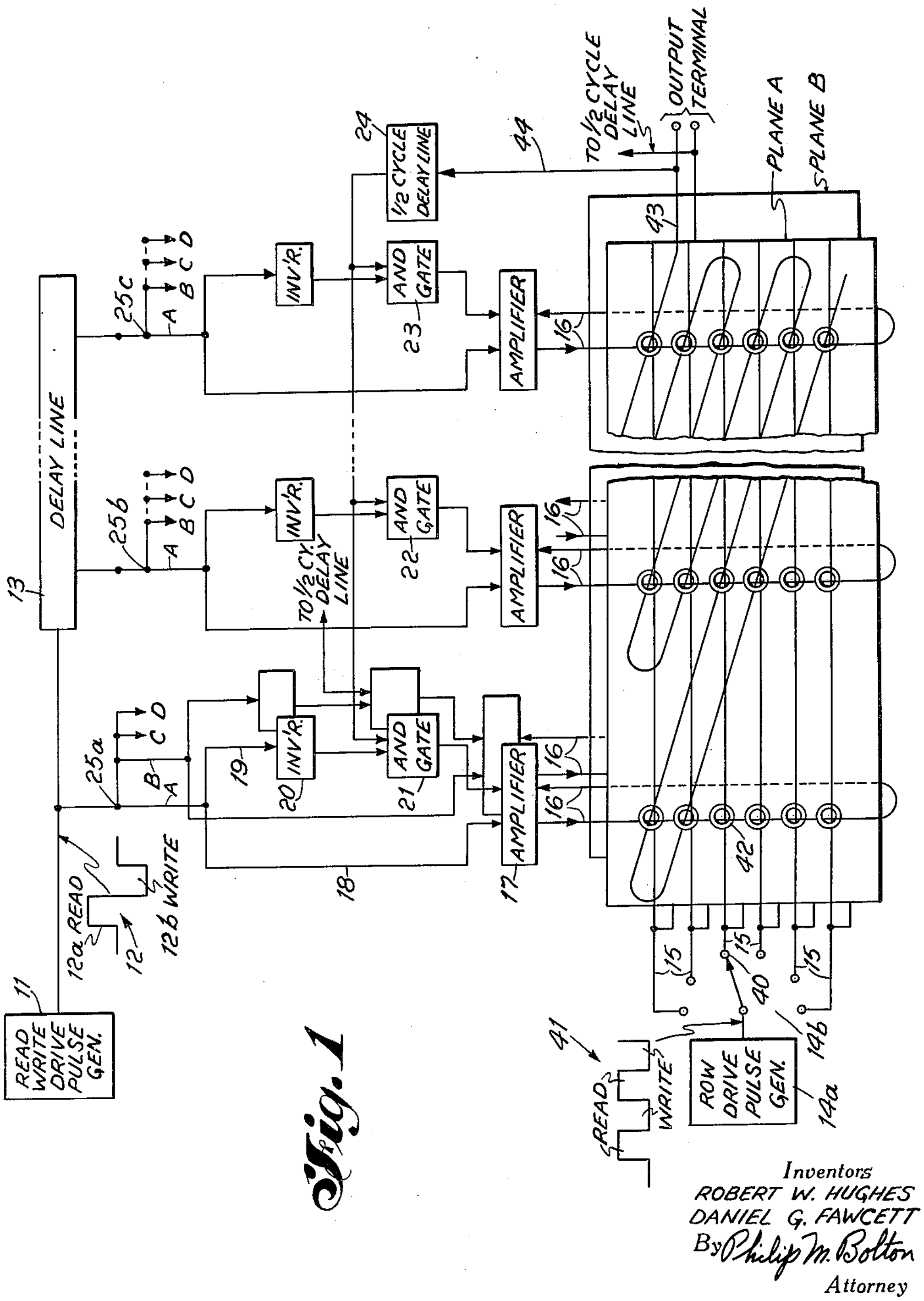
FIG. 1 is a block diagram of a magnetic memory system.

Referring to FIG. 1 a read-write drive pulse generator 11 passes a single read-write drive pulse 12 to a multi-tap distributing delay line 13. As illustrated in FIG. 1 the positive portion 12a is the "read" portion and the negative portion 12b is the "write" portion of pulse 12. For purposes of clarity, with respect to the discussion which follows, a cycle will be defined as the period for the read and write pulse; in other words, a read portion is equal to one-half cycle and a write portion is equal to one-half cycle. A row drive pulse generator 14a is coupled through selection device 14b to a selected one of the row wires 15, which row wires can be rows of serially connected row coils. The selection device may be for example in the form of a switch manually or otherwise controlled. Each of the taps of delay line 13 are circuitry coupled to an associated one of the column wires 16. The circuitry coupling between a delay line tap and its associated column wire is a parallel connection to an amplifier such as 17, with one parallel path 18 passing directly to the amplifier 17 and the other parallel path 19 passing through an inverter 20 and an "and" gate 21. The "and" gate 21 and the equivalent "and" gates 22 and 23 of similar column coupling circuitry are connected in parallel to a common line from the output of a one-half cycle delay line 24. The one-half cycle delay line 24 will delay a pulse passing therethrough for one-half cycle as defined above.

As shown in FIG. 1 the circuitry and components described in connection with plane A are duplicated for plane B, excepting that the connection to the delay line taps for the respective column wires is a common connection for the corresponding column wires of each plane such as the common connections shown at 25a 25b, and 25c. If there are more planes involved in the system than planes A and B for instance, planes C and D, such as are indicated at the common connections 25a 25b and 25c, each of these planes will have the same circuitry and components as described in connection with plane A.

The schematic diagram of FIG. 2 clearly shows the arrangement of the coupling circuitry having the identication numbers of FIG. 1 further identified with a prime. In FIG. 2 the one-half cycle delay line 24' and the inverter 20' are coupled in parallel to a pair of diodes 26 and 27. Diodes 26 and 27 in conjunction with the resistor 28, which is clamped at B+, form an "and" gate which is represented in FIG. 1 by 21 and identified in FIG. 2 as 21'.

The amplifier 17 of FIG. 1 is identified as 17' in FIG. 2 and is composed of two tubes with each tube representing one half of the amplifier and identified as 17a and 17b. Line 18' of FIG. 2 is connected to the grid 29 of the amplifier half 17a, while the output of the above described "and" gate 21' is connected by line 30 to the grid 31 of the amplifier half 17b.

The output signals from each half of the amplifier 17' are applied to the ends of a primary winding 32 of transformer 33 and passed therethrough to the center tap 34. The center tap 34 is connected to the positive side of a source of polarizing voltage for said amplifier halves. The secondary winding 35 of the transformer 33 therefore conducts current in one of two directions depending on which half of the amplifier 17' is conducting and hence the magnetic cores along the column wire 36 are driven in one of two directions depending on which half of the amplifier is conducting.

Returning to FIG. 1 the operation of the readout from the magnetic cores is as follows: The selecting device 14b selects a particular row on which the "word" is stored and from which the "word" is to be read. Let us assume that the row wire 40 is the one selected by the device 14b. Having selected the row, there is passed thereto a train of read-write drive pulses 41, each capable of driving each of the magnetic elements along the row wire chosen to a degree of saturation which equals one-half of complete saturation for each element. As described in connection with the read-write pulse 12, the positive portions of the pulse train 41 represents the "read" portions and the negative portions of the pulse train 41 represents the "write" portions as illustrated in FIG. 1. After the row upon which the "word" has been stored is selected and the pulse train 41 passed thereto, generator 11 passes a single read-write pulse 12 to the delay line 13. The read-write drive pulses from generator 11 pass at a first period of time along the parallel paths 18 and 19. Referring momentarily to FIG. 2, it is clear that the read pulse will cause the amplifier half 17a to conduct and the write portion of the pulse will cause the amplifier half 17b to conduct provided there is proper conditioning of the "and" gate 21'. With the amplifier half 17b conducting, the magnetic element 42' found at the intersection of row wire 40' and column wire 36 will be driven by two driving pulses. Assume that the element 42' is in a $-B_r$ state of saturation. The term B, as used hereinafter, will represent flux density as used in connection with a B—H hysteresis curve and as described in the text "Pulse and Digital Circuits" by Millman and Taub, published by McGraw-Hill, 1956, wherein the term B is used or identified as $\phi$. A first driving pulse from device 14a and a second driving pulse from the amplifier half 17a in combination will drive the element 42 of FIG. 1 to complete saturation or $+B_s$. As stated above, if complete saturation is considered as positive and element 42 is in a state of saturation $-B_r$, or negative residual flux, then there would be a large pulse induced in the readout wire from the element 42. The readout wire is threaded throughout each element as shown by wire 43 of FIG. 1. The readout pulse will pass from the element whose flux polarity has been reversed, along the interweaving readout wire associated with its plane to a connecting wire 44 and on to the one-half cycle delay line 24 of FIG. 1. At the one-half cycle delay line 24 the readout pulse is delayed for one-half cycle, as defined above, in order that it will arrive at the "and" gate 21 in such time as to be in coincidence with the inverted write pulse shown at 12b. As illustrated in FIG. 1 there is a readout wire 43 for each of the planes coupled to connecting wires similar to 44 for each of the planes, with each of said connecting wires passing to an associated one-half cycle delay line. With the write portion 12b being inverted and the readout pulse appearing in coincidence at the "and" gate 21' of FIG. 2, it is clear that the amplifier half 17b will conduct, thus driving the elements along the column wire 36 in the opposite direction; and in conjunction with the write portion of the row drive pulse train shown at 41 of FIG. 1 the element 42' of FIG. 2 is driven to a condition of $-B_s$. If the element 42' had been at $+B_r$ originally when subjected to the coincident read drive pulses, there would have been only a very small output signal and because of the design of the "and" gate 21', this small output signal would not have conditioned the "and" gate 21' sufficiently to carry the amplifier half 17b above its threshold level and hence there would be no re-write drive pulse passed to the elements along the wire 36.

It becomes clear that as the read-write pulses 12 are passed along the delay line 13, the operation of effecting coincidence of the drive pulses, at the intersection of the selected row and the sequentially selected column, follows the delay line pattern. It is also clear that there will only be a rewriting of the information through the "and" gates 21, 22 and 23 when there is a large readout pulse. It is immaterial whether the condition "one" or "zero" is chosen to be represented by $+B_r$ so long as the operation is consistent. In previous hypotheticals $-B_r$ represented by a "zero," therefore a large readout pulse would indicate that a zero was stored in a particular element.

There is a similar arrangement of magnetic elements and connections as shown and described in connection with plane A also found on planes B, C and D. Four planes are indicated in FIG. 1 for purposes of illustration; however, if the code required more, it is obvious that more planes could be added. Assuming that the system is using the popular decimal binary code, then each digit in a "word" would be represented by four bits with one bit stored on each plane physically under the other. The word would be stored along a row and as the read-write pulse 12 passes along the delay line, the word would pass from the stacked planes in a parallel-serial arrangement. For instance, the number 1234 having been stored along the line 40 and being extracted therefrom, would pass from the planes A, B, C and D in the form:

| | | | | *wts* |
|---|---|---|---|---|
| 1 | 0 | 1 | 0 | (1) |
| 0 | 1 | 1 | 0 | (2) |
| 0 | 0 | 0 | 1 | (4) |
| 0 | 0 | 0 | 0 | (8) |

time →

FIG. 4 is a second embodiment of the system. Since the taps found on conventional delay lines are of a high impedance nature, amplifiers are required to work in conjunction with the delay line to pass sufficient current through the elements to effect a change in the flux polarity. FIG 4 is a system for use without the plurality of amplifiers and without the plurality of "and" gates.

In FIG. 4 there is shown a plurality of delay lines 45. The delay lines 45 are serially connected to each other by row wires 46 which pass through each of the elements according to rows aligned with an associated one of the delay lines. Since the delay lines per se are low impedance devices and since there is very little impedance offered by the elements, a read-write current pulse shown at 47 will pass through the delay lines 45 and through the row lines as shown with very little power loss. Assume in connection with FIG. 4 that the row drive pulse generator and selection device 48, which is similar to the devices 14*a* and 14*b* of FIG. 1, selects the line 49 and passes thereto the read-write current pulse train 50. At some time after the selection of line 49 the generator 51 passes in synchronization with train 50 the single read-write current pulse 47 to the first delay line 45. As illustrated in FIG. 4 the positive portion 47*a* of the pulse 47 is the "read" portion and the negative portion 47*b* is the "write" portion. The read portion of the pulse 47 coincides with the read pulse of the train 50 to subject the element 52 to a magnetomotive force capable of reversing the element's flux polarity from $-B_r$ to $+B_s$. If the element 52 has a "zero" stored, which under our hypothesis above, is represented by $-B_r$, then there will be a large readout pulse passing to the amplifier 53 through the one-half cycle delay 54 and simultaneously to the output terminal 55. The system is only desirous of effecting a re-write if there has been a reverse of the flux polarity of an element or as in our example, a readout of a stored "zero." The re-write is effected by a coincidence of the write portions of the pulse 47 and the train 50. The circuit is arranged to nullify the write portion of the pulse 47 excepting if there is a large readout pulse. By inverting the write portion of the pulse through the inverter 56 the amplifier 53 conducts at each write portion of the pulse 47. A positive pulse from amplifier 53 through the parallel network including the resistors 57 and lines 58 will nullify the negative write portion of pulse 47 irrespective of what column wire this write pulse might be affecting. However, a large readout pulse delayed one-half cycle by 54 will cut off the amplifier 53 at the write portion time to permit coincidence of the write portions of the pulse 47 and the train 50 at the write portion time and effect a re-write or restore the element, whose polarity has been reversed, to the state of saturation in which it was prior to the readout. FIG. 4 only illustrates the circuitry and arrangement for a single plane and as illustrated in FIG. 1 there would be a similar arrangement for each plane used in the system with a parallel connection at the delay lines to effect a single delaying action for the pulses going to the corresponding column wires.

While we have described above the principles of our invention in connection with specific apparatus, it is to be clearly understood that this description is made only by way of example and not as a limitation to the scope of our invention as set forth in the objects thereof and in the accompanying claims.

We claim:

1. A magnetic matrix memory system comprising a plurality of saturable magnetic elements arranged in columns and rows, said elements being of material having a substantially rectangular hysteresis curve and capable of assuming bistable states of magnetic remanence, a plurality of row wires, each element in each row being inductively coupled to an associated row wire, a plurality of column wires, each element in each column being inductively coupled to an associated column wire, a readout wire, each element in said matrix inductively coupled to said readout wire, first driving read-write pulse generator coupled to each of said row wires for selecting said row wires for driving each of said row elements coupled to said selected row wire to a first predetermined condition of saturation, a signal delay with a plurality of output terminals positioned at a plurality of different delay points therein, means coupling each of said column wires to an associated terminal of said delay line, and second driving signal means coupled to said signal delay line to transmit a read signal thereto to be passed along said signal delay line for sequentially driving through said terminals each of said column elements according to sequentially selected columns to a second predetermined condition of saturation which in combination with said first predetermined condition of saturation effects a saturation of each of said selected elements sufficient to induce a readout signal in the readout wire.

2. A magnetic matrix memory system according to claim 1, wherein said second driving signal means transmits a read-write driving signal and further includes a re-write means coupled to receive said read-write signals and said readout signals to feed back a readout signal which in coincidence with the write portion of said second drive signal causes the element having had its respective flux polarity changed by said read signal to be redriven to the condition of saturation in which it was prior to being subjected to said read signal.

3. A magnetic matrix memory system comprises a plurality of saturable magnetic elements arranged in columns and rows, said elements being of material having a substantially rectangular hysteresis curve and capable of assuming bistable states of magnetic remanence, a plurality of row coils serially connected according to rows, each element in each row being inductively coupled to a separate row coil, a plurality of column coils serially connected according to columns, each element in each column being inductively coupled to a separate column coil, a plurality of readout coils serially connected, each element in said matrix inductively coupled to a separate readout coil, first driving read-write pulse generator coupled to each of said rows of row coils for selecting said rows and driving each of said row elements in said selected row to a first predetermined condition of saturation, a signal delay line with a plurality of output terminals positioned at a plurality of different delay points therein, means coupling each of said columns of serially connected column coils to an associated terminal of said signal delay means, and second driving read-write pulse generator coupled to said signal delay line to transmit a read signal thereto to be passed along said signal delay line for sequentially driving through said terminals each of said column elements according to sequentially selected columns to a second predetermined condition of saturation which in combination with said first predetermined condition of saturation effects a saturation of each of said selected element sufficient to induce a readout signal in the associated readout coil of said saturated element and rewrite means including an inverter connected to said delay line, an amplifier coupled to said inverter, a gating circuit connected to said inverter and a one-half cycle delay line coupled to said gating circuit.

4. A magnetic matrix memory system comprising a plurality of saturable magnetic elements arranged in columns and rows, said elements being of material having a substantially rectangular hysteresis curve and capable of assuming bistable states of magnetic remanence, a predetermined number of said elements so arranged being positioned in a plane, said system having a plurality of said planes with each of said planes having the same number of columns and rows of said elements, in each plane a plurality of row wires, each element in each row being inductively coupled to an associated row wire, in each of said planes a plurality of column wires, each element in each column being inductively coupled to an associated column wire, in each plane a readout wire, each element in each of said planes being inductively coupled to said readout wire associated with said plane, first driving signal means coupled to each of said row wires for selecting a corresponding row wire in each of said planes and simultaneously driving each of said row elements in said selected row lines in each of said planes to a first predetermined condition of saturation, a signal delay line with a plurality of terminals, each of said column lines connected to an associated terminal of said signal delay line with the corresponding column lines in each of said planes being connected to the same terminal, and second driving signal means coupled to said signal delay line to transmit a read-write signal thereto to be passed along said signal delay line for sequentially driving through said terminals each of said column elements in the sequentially selected corresponding columns to a second predetermined condition of saturation which in combination with said first predetermined condition of saturation effects a saturation simultaneously of each of said selected elements in each of said planes sufficient to respectively induce in the associated readout wires a plurality of readout signals each of which is associated with a particular plane and rewrite means including parallel paths connected to said terminals, one of said paths having a pulse inverter and an "and" gating circuit therein, and a half-cycle delay line coupled between the matrix output and said gating circuit.

5. A magnetic matrix memory system comprising a plurality of saturable magnetic elements arranged in columns and rows, said elements being of material having a substantially rectangular hysteresis curve and capable of assuming bistable states of magnetic remanence, a predetermined number of said elements so arranged being positioned in a plane, said system having a plurality of said planes with each of said planes having the same number of columns and rows of said elements, in each plane a plurality of row coils serially connected according to rows, each element in each row being inductively coupled to a separate row coil, in each of said planes a plurality of column coils serially connected according to columns, each element in each column being inductively coupled to a separate column coil, in each plane a plurality of readout coils serially connected, each element in each of said planes being inductively coupled to a separate readout coil, first driving signal means coupled to each of said rows of row coils for selecting a corresponding row in each of said planes and driving each of said row elements in said selected row simultaneously in each of said planes to a first predetermined condition of saturation, a delay line with a plurality of taps, each of said columns of serially connected column coils connected to an associated tap of said delay line with the corresponding columns in each of said planes being connected to the same tap, and second driving signal means coupled to said delay line to transmit a read-write signal thereto to be passed along said delay line for sequentially driving through said taps each of said column elements in the sequentially selected corresponding columns to a second predetermined condition of saturation which in combination with said first predetermined condition of saturation effects a saturation simultaneously of each of said selected elements in each of said planes sufficient to respectively induce in the associated readout coils a plurality of readout signals each of which is associated with a particular plane and rewrite means including parallel paths connected to said taps, one of said paths having a pulse inverter and a gating circuit therein, and a second delay line coupled to said gating circuit and to the output of said magnetic core matrix.

6. A magnetic matrix memory system as in claim 1, and rewrite means including parallel paths connected to said delay line terminals, one of said paths having a pulse inverter and a gating circuit therein, and a second delay line coupled to said gating circuit and to the matrix output.

7. A magnetic matrix memory system comprising a plurality of saturable magnetic elements arranged in columns and rows, said elements being of material having a substantially rectangular hysteresis curve and capable of assuming bistable states of magnetic remanence, a plurality of row wires, each element in each row being inductively coupled to an associated row wire, a plurality of column wires, each element in each column being inductively coupled to an associated column wire, a readout wire, each element in said matrix inductively coupled to said readout wire, first driving signal means coupled to each of said row wires for selecting said row wires for driving each of said row elements coupled to said selected row wire to a first predetermined condition of saturation, a signal delay means with a plurality of output terminals positioned at a plurality of different delay points therein, means coupling each of said column wires to an associated terminal of said delay means, and second driving signal means coupled to said signal delay means to transmit a read signal thereto to be passed along said signal delay means for sequentially driving through said terminals each of said column elements according to sequentially selected columns to a second predetermined condition of saturation which in combination with said first predetermined condition of saturation effects a saturation of each of said selected elements sufficient to induce a readout signal in the readout wire, said second driving signal means transmitting a read-write driving signal, and a re-write means coupled to receive said read-write signals and said read-out signals to feed back a readout signal which in coincidence with the write portion of said drive signal causes the element having had its respective flux polarity changed by said sufficient saturation to be redriven to the condition of saturation in which it was prior to being subjected to said sufficient saturation, said rewrite means including an inverter serially coupled to said second driving signal means, an amplifier having one control means thereof coupled to said inverter, a second delay means, a second control means coupled through said second delay means to said readout line, a plurality of second column wires with one each being inductively coupled to each element on an associated column, circuitry means coupling the output of said amplifier to said plurality of second column wires.

8. A magnetic matrix memory system comprising a plurality of saturable magnetic elements arranged in columns and rows, said elements being of material having a substantially rectangular hysteresis curve and capable of assuming bistable states of magnetic remanence, a plurality of row coils serially connected according to rows, each element in each row being inductively coupled to a separate row coil, a plurality of column coils serially connected according to columns, each element in each column being inductively coupled to a separate column coil, a plurality of readout coils serially connected, each element in said matrix inductively coupled to a separate readout coil, first driving signal means coupled to each of said rows of row coils for selecting said rows and driving each of said row elements in said selected row to a first predetermined condition of saturation, a first delay means with a plurality of taps, second driving signal means coupled through said first delay means to each of said columns of column coils for driving each of said column elements in a selected column to a second predetermined condition of saturation, each element being sequentially driven to said first and second predetermined conditions of saturation simultaneously thereby being effectively driven to sufficient saturation to induce a readout pulse in the associated readout coil of said saturated element, third means coupling said readout coil means to said second driving signal means to cause any element having had its respective flux polarity changed by said sufficient saturation to be redriven to the condition of saturation in which it was prior to being subjected to said sufficient saturation, said third means including a second delay means serially coupled to said serially coupled readout coil means, a plurality of "and" gates, said second delay means circuitry coupled in parallel to one input of each of said plurality of "and" gates, a plurality of inverter means coupled to said first delay means, each of said inverter means coupled to the other input of its associated "and" gate, a plurality of amplifiers each of which is associated with one of said columns of serially connected column coils, each of said "and" gates being coupled to an associated one of said amplifiers.

9. A magnetic matrix memory system comprising a plurality of saturable magnetic elements arranged in columns and rows, said elements being of material having a substantially rectangular hysteresis curve and capable of assuming bistable states of magnetic remanence, a plurality of row coils serially connected according to rows, each element in each row being inductively coupled to a separate row coil, a plurality of column coils serially connected according to columns, each element in each column being inductively coupled to a separate column coil, a plurality of readout coils serially connected, each element in said matrix inductively coupled to a separate readout coil, first driving signal means coupled to each of said rows of row coils for selecting said rows and driving each of said row elements in said selected row to a first predetermined condition of saturation, second driving signal means coupled to each of said columns of column coils for driving each of said column elements in a selected column to a second predetermined condition of saturation, each element being sequentially driven to said first and second predetermined conditions of saturation simultaneously thereby being effectively driven to sufficient saturation to induce a readout pulse in the associated readout coil of said saturated element, and third means coupling said readout pulse to said second driving signal means to cause any element having its respective flux polarity changed to produce said readout pulse to be redriven to the condition of saturation in which it was prior to producing said readout pulse.

10. A magnetic matrix memory system comprising a plurality of saturable magnetic elements arranged in columns and rows, said elements being of material having a substantially rectangular hysteresis curve and capable of assuming bistable states of magnetic remanence, a plurality of row wires, each element in each row being inductively coupled to an associated row wire, a plurality of column wires, each element in each column being inductively coupled to an associated column wire, a readout wire, each element in said matrix inductively coupled to said readout wire, first driving signal means coupled to each of said row wires for selecting said row wires for driving each of said row elements coupled to said selected row wire to a first predetermined condition of saturation, a signal delay means with a plurality of output terminals positioned at a plurality of different delay points therein, means coupling each of said column wires to an associated terminal of said delay means, second driving signal means coupled to said signal delay means to transmit a read signal thereto to be passed along said signal delay means for sequentially driving through said terminals each of said column elements according to sequentially selected columns to a second predetermined condition of saturation which in combination with said first predetermined condition of saturation effects a saturation of each of said selected elements sufficient to induce a readout signal in the readout wire, and rewrite means responsive to said readout signal and the signal of said second driving signal means to produce a signal causing said selected elements to be redriven to the condition of saturation in which they were prior to being subjected to said read signal.

11. A magnetic matrix memory system comprising a plurality of saturable magnetic elements arranged in columns and rows, said elements being of material having a substantially rectangular hysteresis curve and capable of assuming bistable states of magnetic remanence, a plurality of row coils serially connected according to rows, each element in each row being inductively coupled to a separate row coil, a plurality of column coils serially connected according to columns, each element in each column being inductively coupled to a separate column coil, a plurality of readout coils serially connected, each element in said matrix inductively coupled to a separate readout coil, a first driving read-write pulse generator coupled to each of said rows of row coils for selecting said rows and driving each of said row elements in said selected row to a first predetermined condition of saturation, a signal delay line with a plurality of output terminals positioned at a plurality of different delay points therealong, means coupling each of said columns of serially connected column coils to an associated terminal of said delay line, a second driving read-write pulse generator coupled to said delay line to transmit a read signal thereto to be passed along said delay line for sequentially driving through said terminals each of said column elements according to sequentially selected columns to a second predetermined condition of saturation which in combination with said first predetermined condition of saturation effects a saturation of each of said selected elements sufficient to induce a readout signal in the associated readout coil of said saturated element, and a rewrite means coupled to said serially connected readout coils and each of said output terminals to cause said selected elements to be redriven to the condition of saturation in which they were prior to being subjected to said read signal.

12. A magnetic matrix memory system comprising a plurality of saturable magnetic elements arranged in columns and rows, said elements being of material having a substantially rectangular hysteresis curve and capable of assuming bistable states of magnetic remanence, a plurality of row coils serially connected according to rows, each element in each row being inductively coupled to a separate row coil, a plurality of column coils serially connected according to columns, each element in each column being inductively coupled to a separate column coil, a plurality of readout coils serially connected, each element in said matrix inductively coupled to a separate readout coil, a first driving read-write pulse generator coupled to each of said rows of row coils for selecting said rows and driving each of said row elements in said selected row to a first predetermined condition of saturation, a signal delay line with a plurality of output terminals positioned at a plurality of different delay points therealong, means coupling each of said columns of serially connected column coils to an associated terminal of said delay line, a second driving read-write pulse generator coupled to said delay line to transmit a read signal thereto to be passed along said signal delay line for sequentially driving through said terminals each of said column elements according to sequentially selected columns to a second predetermined condition of saturation which in combination with said first predetermined condition of saturation effects a saturation of each of said selected element sufficient to induce a readout signal in the associated readout coil of said saturated element, and rewrite means coupled to said serially connected readout coils and each of said output terminals responsive to the write portion of the read-write pulse of said second generator and said readout signal to produce a rewrite signal to drive said selected elements to the condition of saturation in which they were prior to being subjected to said read signal.

References Cited in the file of this patent

UNITED STATES PATENTS

| | | |
|---|---|---|
| 2,691,155 | Rosenberg | Oct. 5, 1954 |
| 2,750,580 | Rabenda et al. | June 12, 1956 |
| 2,784,391 | Rajchman et al. | Mar. 5, 1957 |
| 2,931,014 | Buchholz et al. | Mar. 29, 1960 |